US006320537B1

(12) United States Patent
Chien et al.

(10) Patent No.: US 6,320,537 B1
(45) Date of Patent: Nov. 20, 2001

(54) BEAM FORMING NETWORK HAVING A CELL REUSE PATTERN AND METHOD FOR IMPLEMENTING SAME

(75) Inventors: Chih-Hsien Chien, Rancho Palos Verdes; Dale A. Londre, Anaheim Hills; Kevin L. Sutton, Moorpark, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/500,754

(22) Filed: Feb. 8, 2000

(51) Int. Cl.[7] .............................. H01Q 21/06; G01S 3/28
(52) U.S. Cl. ............................................ 342/361; 342/383
(58) Field of Search .................................... 342/361, 368, 342/373, 383; 455/562

(56) References Cited

U.S. PATENT DOCUMENTS 6,078,287 * 6/2000 Thompson et al. .................. 342/368

OTHER PUBLICATIONS

Roman, V.I, "Frequency Reuse and System Deployment in Local Multipoint Distribution Service", IEEE Personal Communications, Dec. 1999, pp. 20–27.*

* cited by examiner

*Primary Examiner*—Gregory C. Issing
(74) *Attorney, Agent, or Firm*—Terje Gudmestad

(57) ABSTRACT

A beam forming network having a division network for a hexagonal structure of elements, where the neighboring elements in the same column, having the same primary polarization, have three-way power division. The neighboring elements in adjacent columns, having a different primary polarization, have four-way power division. In the combining network, seven signals are combined from outputs of elements having the same polarization. Three of the signals will come from adjacent elements in the same column, and four signals will come from feeds in adjacent columns that are diagonal to the center element. The overlapping element configuration covers a large geographical area with reduced interference between neighboring elements. A waveguide implementation of the beam-forming network of the present invention is provided in which waveguides are structures so as to avoid crossovers, thereby eliminating interference and simplifying construction and assembly techniques.

13 Claims, 9 Drawing Sheets

BEAM FORMING NETWORK HAVING A CELL REUSE PATTERN AND METHOD FOR IMPLEMENTING SAME

TECHNICAL FIELD

The present invention relates to a multiple beam antenna array. More particularly, the present invention relates to a beam-forming network having a multiple frequency, dual polarization, cell reuse pattern.

BACKGROUND ART

Multiple beam antennas are antennas that form a plurality of communication beams. Commercial communications satellites typically employ multiple beam antennas that have one or more feed elements. The feed elements may be direct radiating or they may feed a reflector or a lens.

Multiple beam antennas have feed element groups that overlap, whereby a feed element is driven to generate a beam component that is combined with component beams from other feed elements to form a composite beam, or communications beam. A low-level beam forming network within the communications satellite controls the interaction of feed elements.

Conventional beam forming networks that generate multiple beams from a feed array describe planar dividers and combiners connected by individual connections having predetermined propagation delays. The beam forming networks are typically comprised of seven-way power dividers and combiners. The excessive number of divider and combiner structures required in these prior art beam forming networks are large and adversely affect signal routing design efficiency.

An example of a prior art beam forming network power divider 100 is shown in FIG. 1. An input signal is divided seven ways. Each element 103 receives a main vector 102 and six coupled vectors 104 surrounding the main vector 102. Each signal vector 102, 104 is weighted in amplitude and phase before combining in a power combiner 200 shown in FIG. 2. Inputs 202 from six of the adjacent elements 103 are combined to produce a single output. Typically, the power divider network is on a separate section from the power combiner network.

The prior art beam forming networks require divider and combiner networks, like the ones shown in FIGS. 1 and 2, that send and receive signal energy from all adjacent cells in two polarizations. For a hexagonal structure, a center cell surrounded by six cells, the dividing network is 1:7 and is repeated for all cells and all polarizations. Undesirable interference occurs between adjacent cells. The seven-way power divider and combiner networks are unnecessarily complex adding unwanted size and weight to the beam-forming network.

SUMMARY OF THE INVENTION

The present invention describes a beam forming network having a divider/combiner network in a dual polarization communications system that uses fewer and smaller elements, affording more efficient routing in the network design. The beam-forming network of the present invention reduces the complexity and the size of the divider/combiner networks.

The present invention is configured such that hexagonally structured feed elements are arranged in columns and rows. No two adjacent columns in the beam-forming network have the same primary polarization, and no two adjacent rows have the same frequency, thereby eliminating potential interference.

Three-way power division is provided for the primary polarization and four-way power division for the non-primary polarization. Elements in adjacent columns have alternating primary polarizations. Therefore, the primary polarization may be right hand circular (RHC) and the non-primary polarization left hand circular (LHC), while in an adjacent column of elements the primary polarization is LHC and the non-primary polarization is RHC. The combiner network of the present invention has seven way combining in every other column. This configuration eliminates unnecessary signal division and combination, thereby improving the efficiency of the beam-forming network and reducing the size of the divider and combiner networks.

The beam-forming network of the present invention uses the symmetry of a hexagonal structure to reduce the size of dividers from 1:7 to a network of 1:3 and 1:4 dividers. Fewer combiners, and smaller dividers reduce the packaging complexity.

It is an object of the present invention to reduce the size and complexity of a beam-forming network. It is another object of the present invention to reduce the size of the dividing network by recognizing the distribution of polarization and frequency between cells. It is yet another object of the present invention to provide a polarization and frequency reuse configuration for a hexagonal structure such that the dividers for a given polarization feed less than all of the adjacent neighbors.

It is a further object of the present invention to provide a dividing network that requires a three-way divider for the primary polarization in cells in the same column and a four-way divider for the non-primary polarization in neighboring cells in adjacent columns. It is still a further object of the present invention to reduce the number of combiners, and therefore the complexity of the combining network.

Yet a further object of the present invention is to provide seven-way combining in alternating columns of feeds in a beam forming network, such that the combiners for a given primary polarization feed less than all of the neighboring feed elements.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
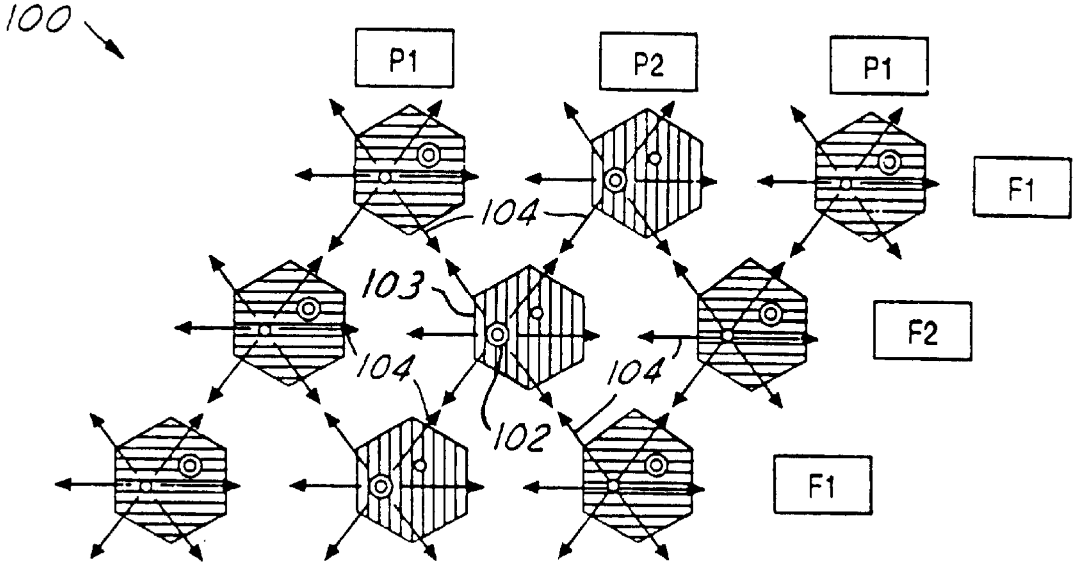
(PRIOR ART) FIG. 1
FIG. 1 is a power divider network for a prior art beam-forming network.
Figure 2:
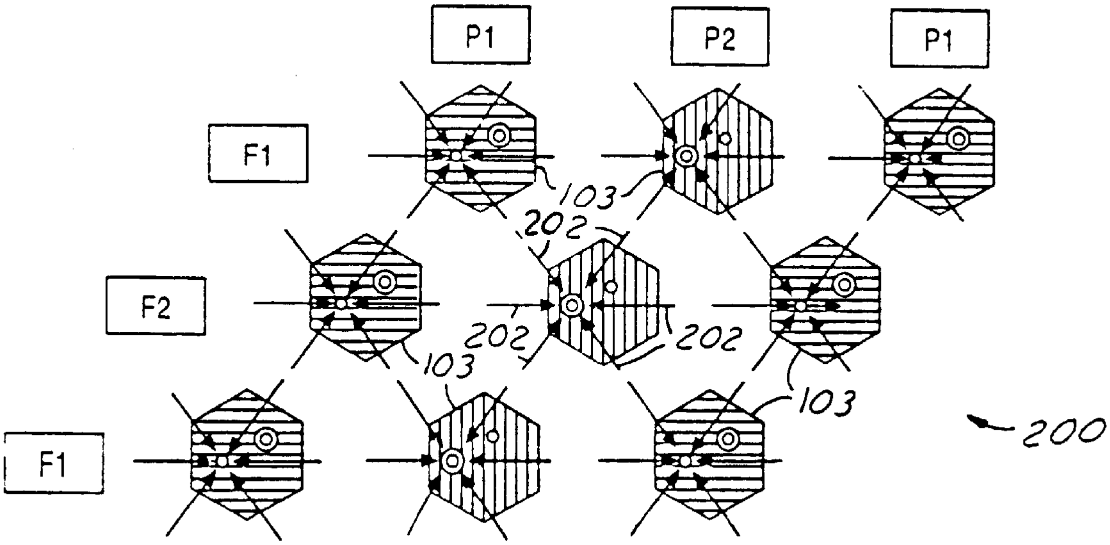
(PRIOR ART) FIG. 2
FIG. 2 is a power combiner network for a prior art beam-forming network.
Figure 3:
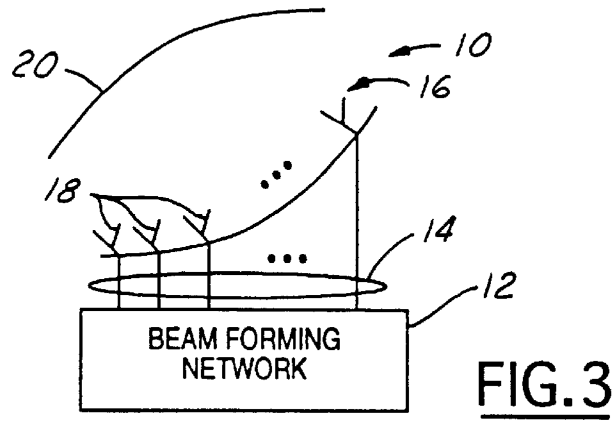
FIG. 3 is an example of a multiple beam antenna array.

FIG. 3 illustrates a multiple beam antenna system 10 having a beam forming network 12. The beam-forming network has a plurality of ports 14 that connect the beam forming network 12 to a feed array 16. The feed array 16 has a plurality of elements 18 that are arranged in a desired pattern and are connected to the ports 14. A reflector 20 cooperates with the feed array 16 to reflect incoming or outgoing signals to and from the feed elements 18.

Figure 4:
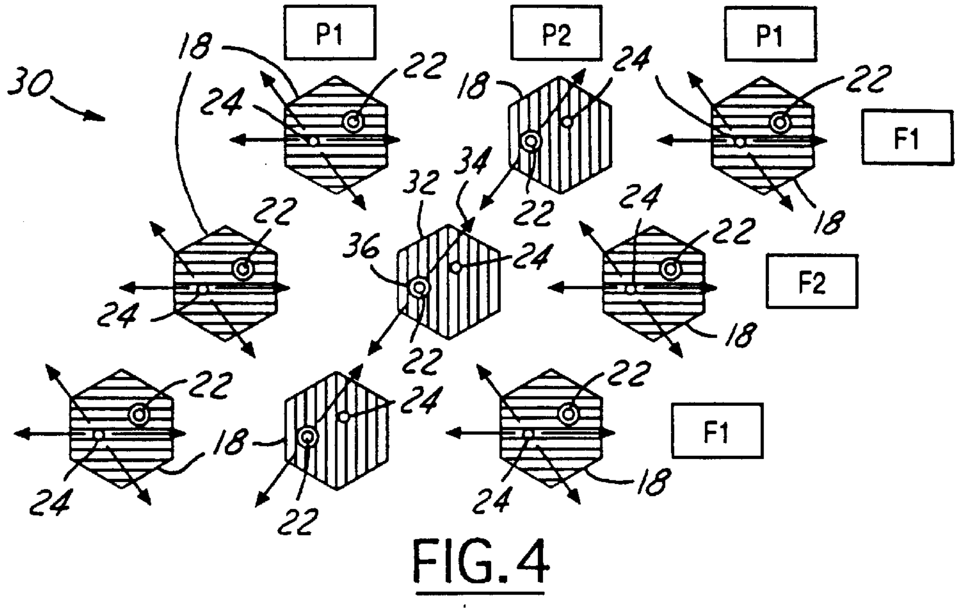
FIG. 4 is a portion of a power divider network for the beam-forming network of the present invention.
Figure 5:
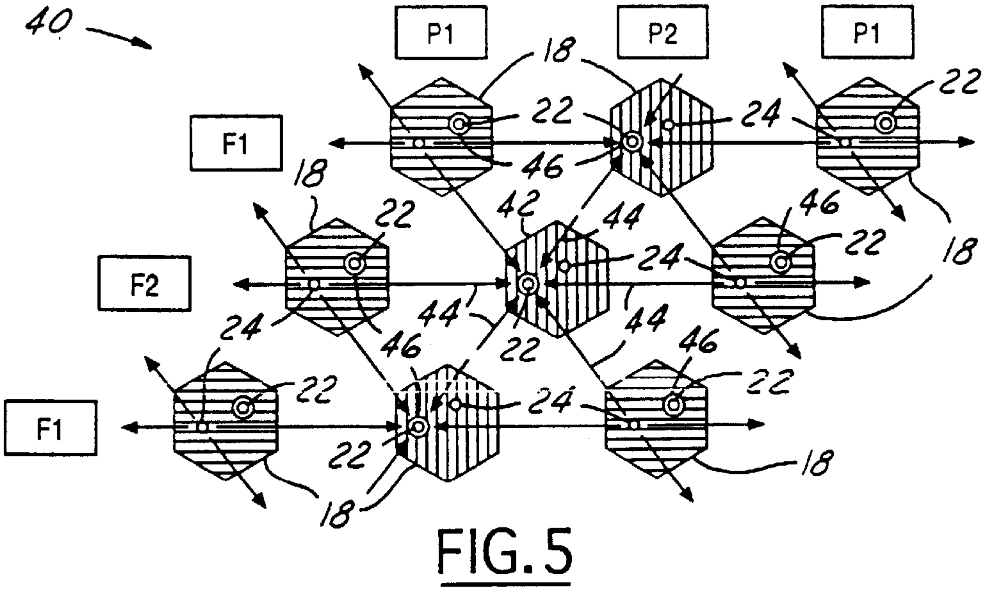
FIG. 5 is a portion of a power combiner network for the beam-forming network of the present invention.

The plurality of feed elements 18 cooperate to define a resultant beam. Referring to FIGS. 4 and 5, clusters of feed elements 18 are shown grouped adjacent to one another. Each element 18 transmits a component of the resultant beam. Each feed element 18 may transmit beam components to more than one resultant beam simultaneously.

Individual feed elements 18 are arranged in a predetermined pattern to provide a hexagonal structure. Each element 18 receives inputs in both left hand and right hand circular polarization. Only one polarization is primary 22. The other polarization is considered non-primary 24.

Adjacent columns of elements 18 have different primary polarizations. In this figure, only the primary polarization is shown and is indicated by vertical or horizontal lines in the hexagon. For example, the columns labeled P1 may have Left Hand Circular (LHC) primary polarization and Right Hand Circular (RHC) non-primary polarization. Column P2 will have Right Hand Circular (RHC) primary polarization and Left-Hand Circular (LHC) non-primary polarization. Alternating primary polarizations for the columns of elements 18 reduces interference between adjacent columns.

Adjacent rows of elements 18 have different frequencies from one another. Frequency diversity between adjacent rows reduces interference. The system in FIGS. 4 and 5 shows two frequencies, F1 and F2. However, it should be noted that more frequencies are possible.

The power divider 30 for the primary polarization is shown in FIG. 4 and the operation of the power divider 30 will be described in reference to a center element 32. Column P2 has a primary polarization 22 that is, for example, RHC. The elements 18 in column P2 require coupling to only two of their neighbors. The center element 32 has coupling signals 34 to the two adjacent elements 18 in the same column. The center element 32 also has a through signal 36. Three-way power division of the primary polarization, instead of seven-way power division, is all that is necessary for the elements 18 in the same column P2 having the same primary polarization 22. The elements 18 in column P2 have the same primary polarization 22, but have different frequencies, F1 and F2, thereby reducing the potential for signal interference.

The elements 18 in adjacent columns (labeled P1) have a different primary polarization 22 than elements 18 in column P2. However, the nonprimary polarization 24 for elements in adjacent columns is the same as the primary polarization 22 for elements 18 in column P2. The non-primary polarization signal 24 for elements in adjacent columns has four-way power division and couples signals to four neighboring elements 18 in adjacent columns, i.e. column P2. Therefore, two elements 18 in each column adjacent to column P2 will provide a coupling signal to an element in column P2. The elements 18 in adjacent columns do not couple to cells in the same column, and therefore do not need to be divided accordingly.

In the prior art, a signal is divided seven ways in order to couple signals to each of the six adjacent neighbors and provide a through signal. In the power divider network of the present invention, signal division is three-ways for one column of elements and four-ways for elements in adjacent columns. The through signal is provided for in the columns of feed elements having three-way power division. The power divider network is smaller and less complex than prior art seven-way power divider networks.

The power combiner network 40 for the primary polarization is described with reference to FIG. 5 and a center element 42. The center element 42 receives signals from the six adjacent neighbors. The composite beam is formed from six coupled signals and a through signal coming from outputs having the same polarization, i.e. primary polarization for elements in the same column and non-primary polarization for elements in adjacent columns.

Three signals come from adjacent feeds in the same column, i.e. column P2 in the present example. One signal 44 from each of the neighboring elements 18 and one signal 46 from the center element 42 itself. Feed elements in the same column have the same primary polarization 22. The remaining four signals come from feeds 18 in adjacent columns P1 and P2 that are diagonal to the center feed 42 and have a non-primary polarization 24 that matches the primary polarization 22 for the center feed 42. The power combiner network 40 has power combining in every other column, unlike prior art power combiner networks that have 7:1 combiners for every element.

The configuration for the beam-forming network of the present invention can cover a large geographic area with reduced interference between neighboring elements. The interference between any element and next-to-adjacent neighbors are reduced by properly weighting the seven signals to achieve side-lobe reduction. With the polarization and frequency reuse configuration, it is not necessary for the dividers for a given polarization to feed all six neighboring elements. The two nearest neighbors, i.e. the elements above and below in the same column, have the same primary polarization. Prior art beam forming networks require divider and combiner networks that send and receive signal energy from all adjacent elements for both polarizations. By recognizing the distribution of polarization and frequency between elements, the dividing network of the present invention is reduced for adjacent elements with the same primary polarization in the same column.

Figure 6:
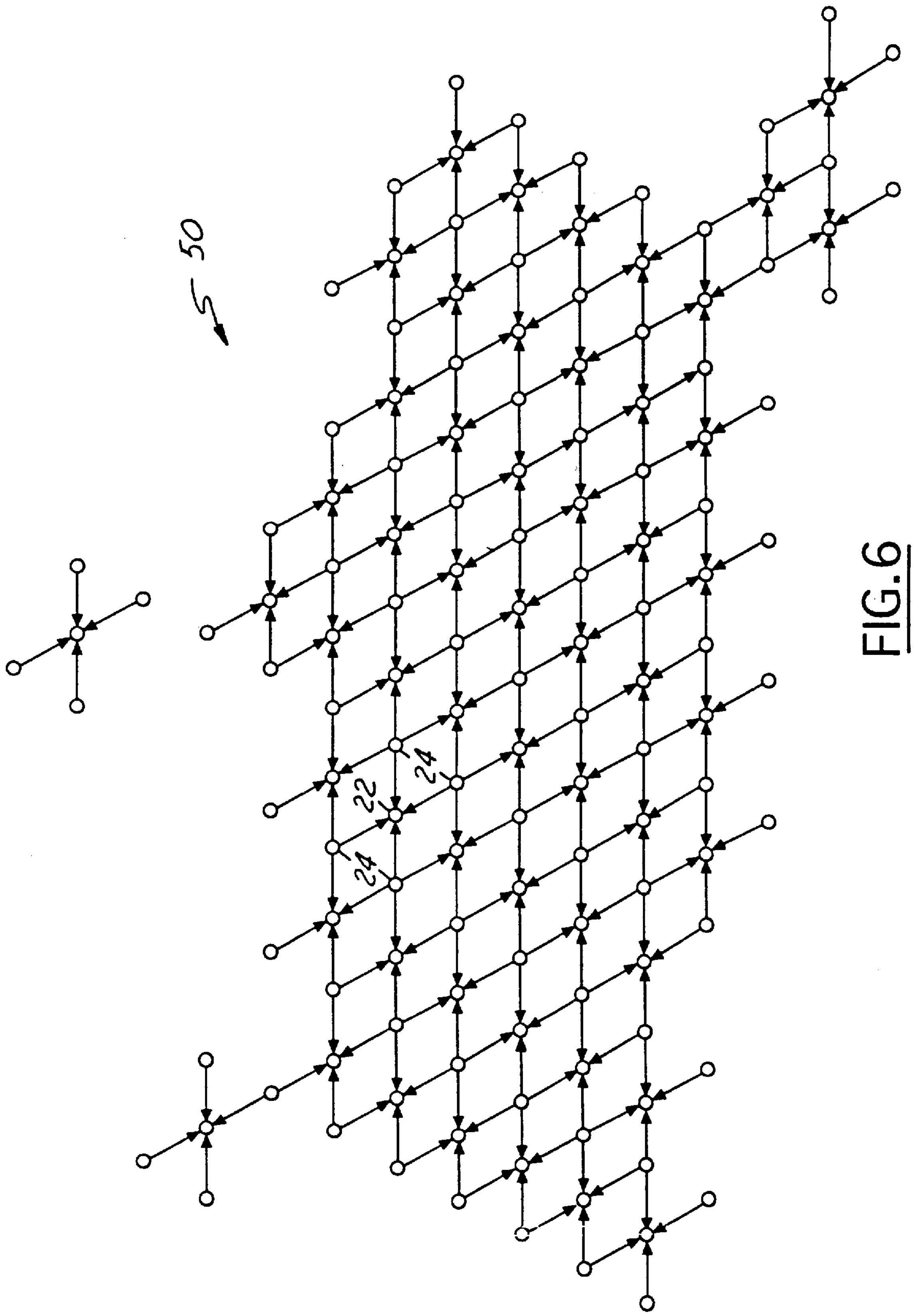
FIG. 6 is a vector diagram representing a first layer layout for left hand circular polarization in a stripline implementation of the divider network for the beam-forming network of the present invention.
Figure 7:
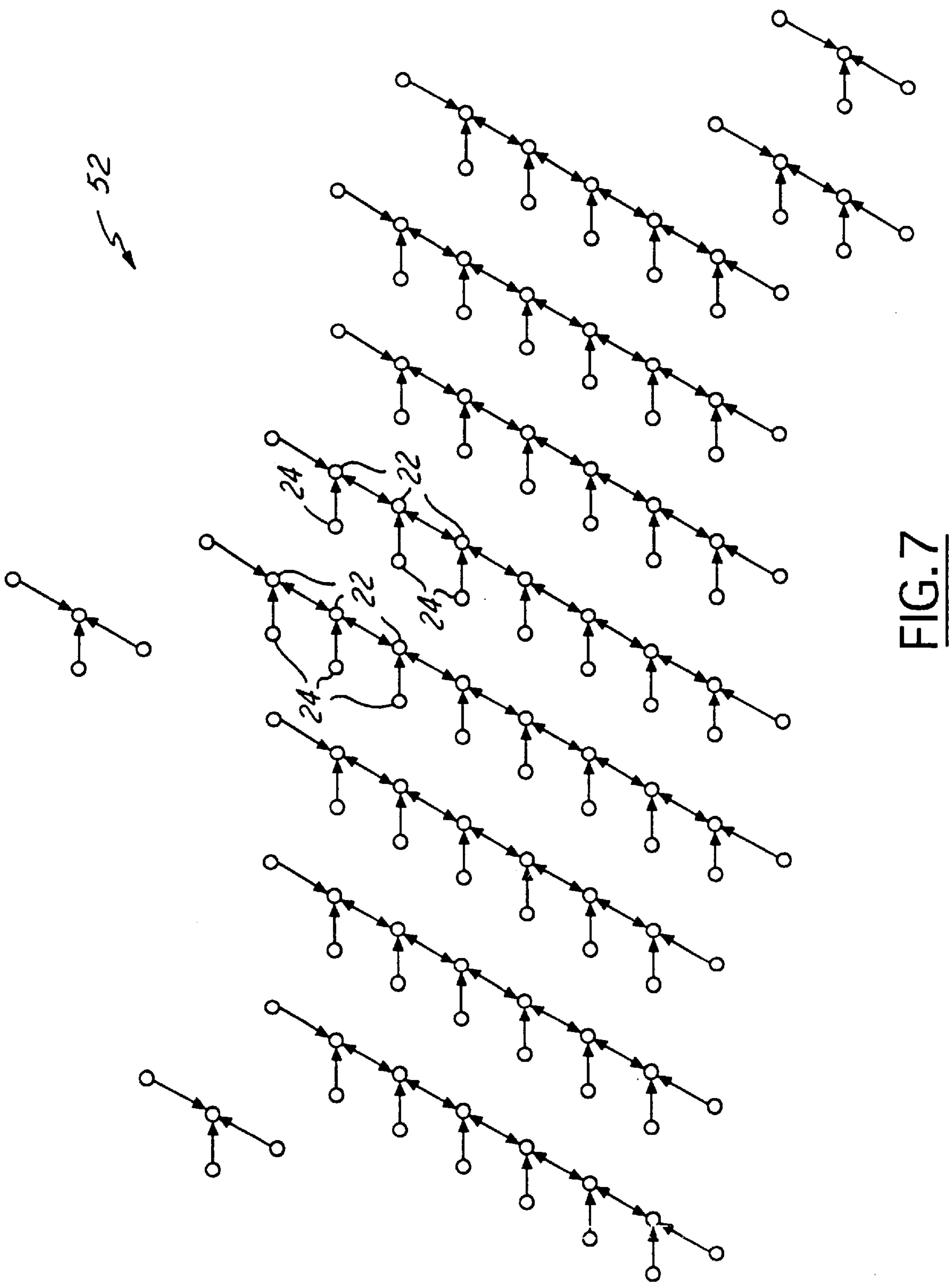
FIG. 7 is a vector diagram representing a econd layer layout for left hand circular polarization in a stripline implementation of the divider network for the beam forming network of the present invention.

The beam-forming network of the present invention may be implemented using stripline technologies. Stripline implementation allows different combinations of dividing and combining on the same section. In the stripline implementation each polarization has two sections. The first section 50 for Left Hand Circular polarization, shown in FIG. 6, divides the non-primary polarization element signals 24 by four and recombines by four on the same section. The second section 52, shown in FIG. 7, divides the primary polarization element signal 22 by three and recombines by four.

In prior art seven way power dividers the signal division and signal combination are performed on separate sections. All signal division is performed in one section and all signal combining is performed in another section. The sections are parallel and the through ports are perpendicular between the sections. In the present invention, the signal division and combining is mixed between the two sections. Partial signal division can be performed simultaneously with signal combining on the first section. The remaining signal division and combining is performed on the second section.

Figure 8:
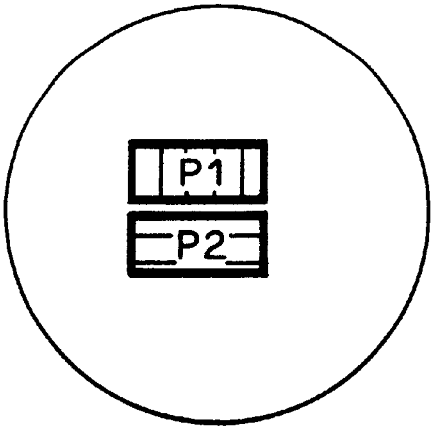
FIG. 8 is a diagram of a single element having primary and non-primary polarizations.
Figure 9:
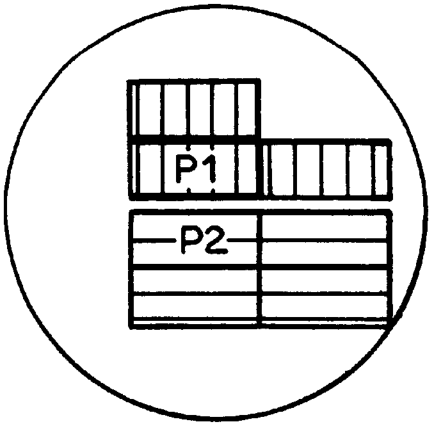
FIG. 9 is a diagram of a first configuration in which the primary polarization is labeled P1.
Figure 10:
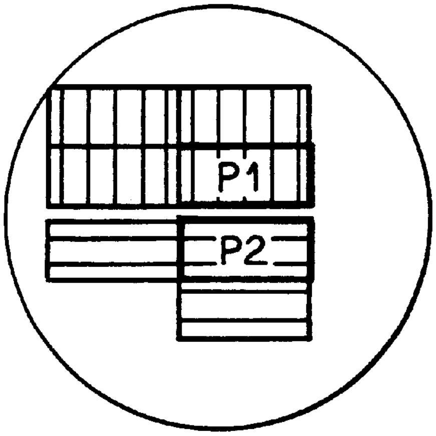
FIG. 10 is a diagram of a second configuration in which the primary polarization is labeled P2.

The beam-forming network of the present invention may be implemented using waveguides. FIG. 8 is an example of a basic signal routing schedule. FIG. 8 is a graphical representation of a single element 62 and shows how the element 62 outputs two polarization outputs, P1 and P2. The polarization outputs, P1 and P2, are divided in one of two configurations. FIG. 9 is one configuration in which P1 is the primary polarization and is divided three ways. P2 is the non-primary polarization and is divided four ways. FIG. 10 is the other configuration in which P1 is the nonprimary polarization and is divided four ways. P2 is the primary polarization, and therefore, divided three ways.

Figure 11A:
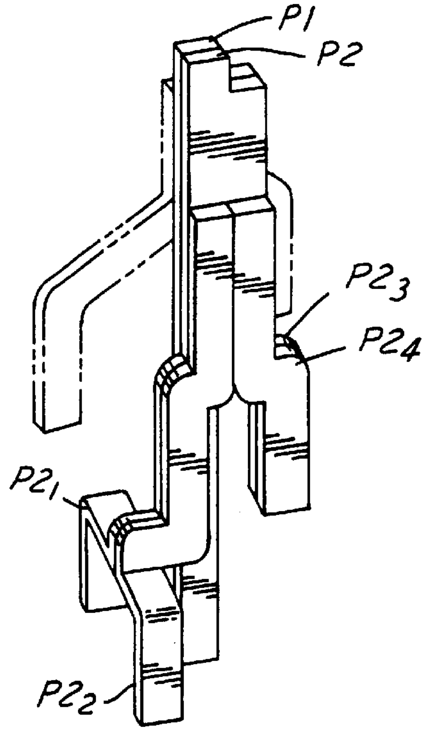
FIG. 11*a* is a front perspective view of an element having a primary polarization P1 divided three-ways and a non-primary polarization P2 divided four-ways.
Figure 11B:
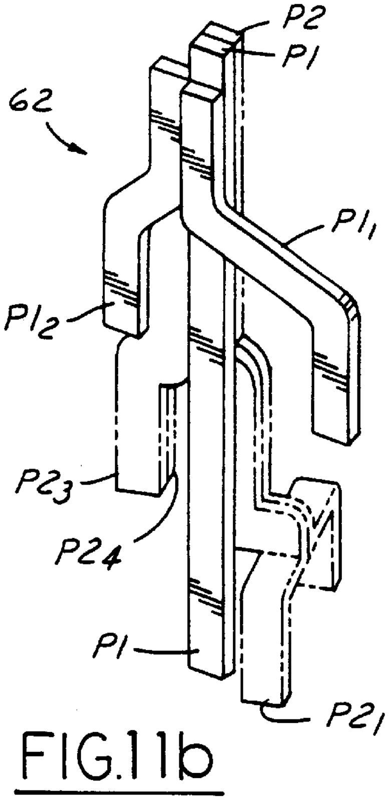
FIG. 11*b* is a rear perspective view of an element having a primary polarization P1 divided three-ways and a non-primary polarization P2 divided four-ways.

FIG. 9 correlates to FIGS. 11*a* and 11*b* which show the routing scheme of a waveguide implementation of the first configuration in which P1 is the primary polarization and is divided three ways and P2 is the non-primary polarization and is divided four ways. FIG. 11*a* clearly shows P2 divided into four signals by $P2_1$, $P2_2$, and $P2_3$, and $P2_4$. FIG. 11*b* shows the primary polarization P1, which has the through signal P1, and the divided signals $P1_1$ and $P1_2$.

Figure 12A:
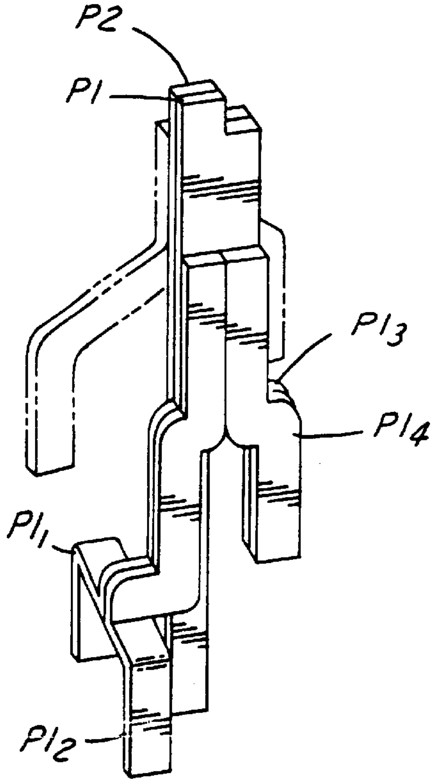
FIG. 12*a* is a front perspective view of an element having a non-primary polarization P1 divided four-ways and a primary polarization P2 divided three-ways.
Figure 12B:
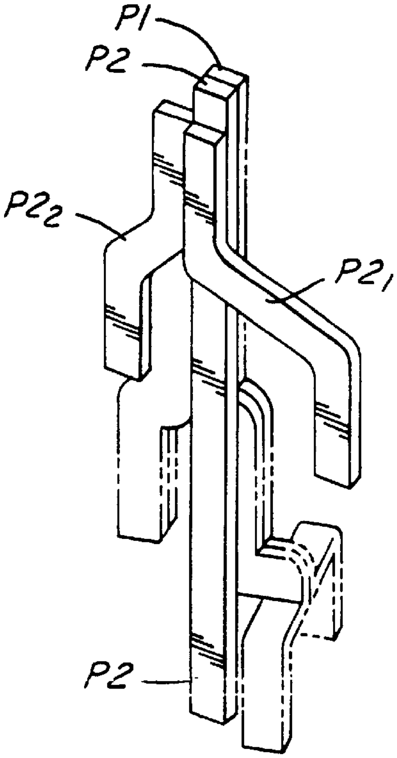
FIG. 12*b* is a rear perspective view of an element having a non-primary polarization P2 divided four-ways and a primary polarization P1 divided three-ways.

FIGS. 12*a* and 12*b*, corresponding to FIG. 10, show the routing scheme of a waveguide implementation of the second configuration. In FIG. 12*a*, P1 is the non-primary polarization and, therefore, is divided four ways into $P1_1$, $P1_2$, $P1_3$, and $P1_4$. FIG. 12*b* shows the primary polarization, P2, as it is divided three ways into the through signal P2 and $P2_1$, and $P2_2$.

Figure 13:
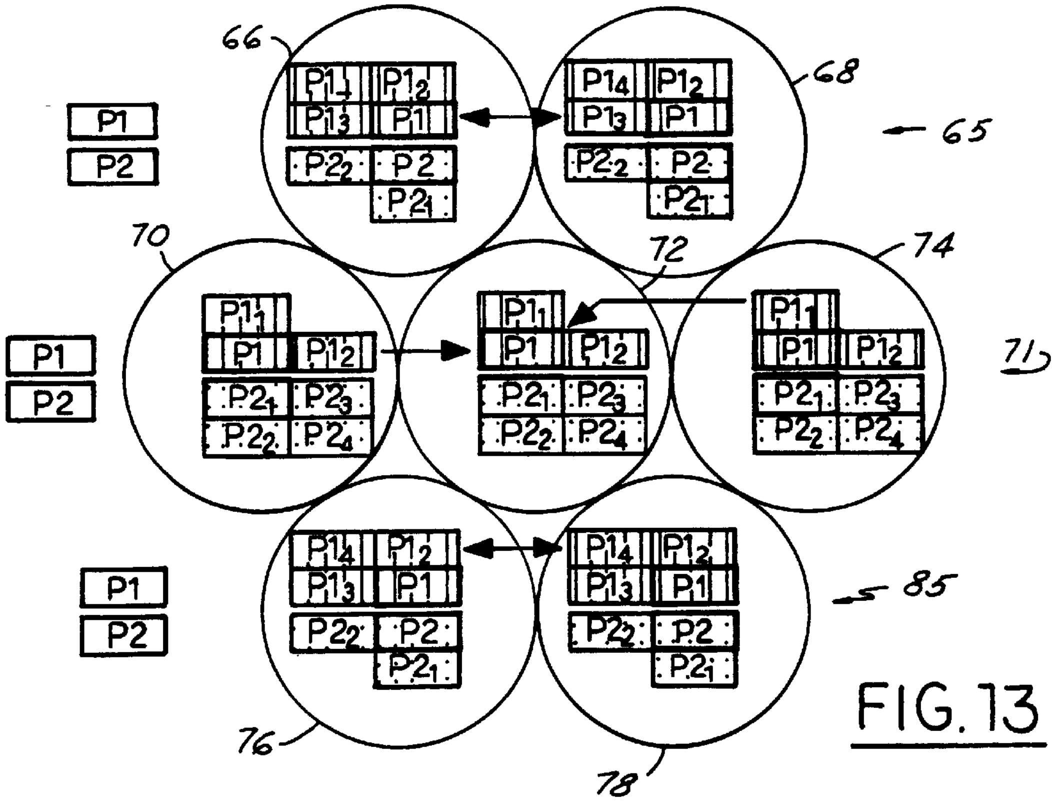
FIG. 13 is a diagram of a cluster of 7 elements having the dividing and combining networks implemented by waveguide couplers according to the present invention.

Referring now to FIG. 13, the elements are shown combined in rows. Each row contains elements having the same configuration, i.e. the first configuration shown in FIGS. 11*a* and 11*b*. The configuration of the elements will alternate with each row. For example, FIG. 13 shows a center row 71 having elements with the first configuration that are flanked by rows 65 and 85 having elements with the second configuration. This allows the combining according to the present invention and described hereinafter.

According to the present invention, the primary polarization, whether it is P1 or P2, is divided three ways. However, the primary polarization signal alternates with each row. Alternating polarizations avoids interference and allows the cell reuse pattern of the present invention to be implemented. The center row 71 has elements 70, 72, and 74 having a primary polarization P1 divided three ways. Row 71 is flanked by rows 64 and 85 that have a non-primary polarization P1 that is divided four ways.

Referring still to FIG. 13 a group of seven elements, labeled 66, 68, 70, 72, 74, 76, and 78 are arranged in a hexagonal structure. Only seven elements are shown for clarity. However, it should be noted that the network may be replicated without interference from adjacent overlapped composite beams because of the arrangement of the primary and nonprimary polarizations and the frequency differences between adjacent elements.

Figure 14:
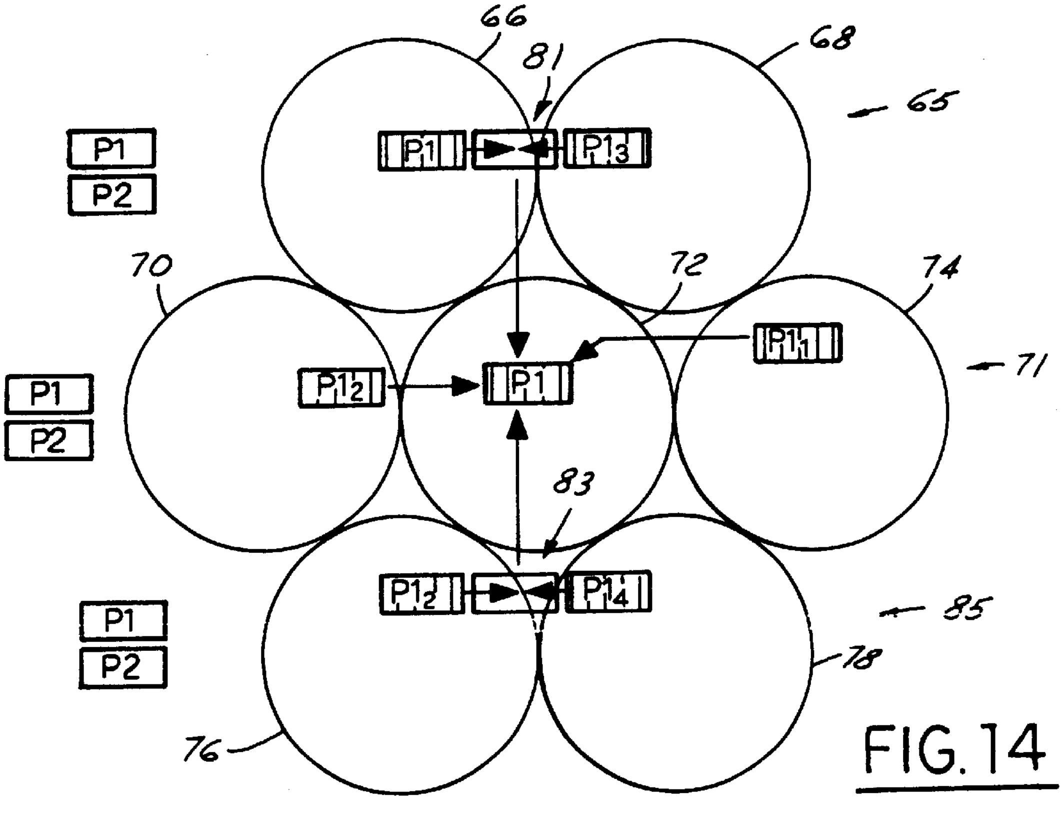
FIG. 14 is a diagram of a cluster of 7 elements showing the combining configuration of one embodiment of the present invention.

Combination of the divided signals is described herein also with reference to FIG. 13 in conjunction with FIG. 14. The elements 66 and 68, in the top row of the group, produce outputs $P1_1$ and $P1_3$, respectively, which combine to form one output shown by reference number 81 in FIG. 14. Referring again to FIG. 13, the elements 76 and 78, in row 85 of the group, produce outputs $P1_2$ and $P1_4$, respectively, which combine to form one output shown by reference number 83 in FIG. 14. The resulting output 81 and the resulting output 83 are in line with the output P1 of element 72.

A waveguide bend, or any other suitable manner, aligns the output $P1_1$ of element 74 and combine with the output P1 of element 72. In a similar manner, the output $P1_2$ of element 70 is offset to align and combine with the output P1 of element 72. The outputs 81, 83, and, P1 are all in vertical alignment with one another and are now in position to be combined. Phase and amplitude adjustments can be introduced in the waveguide runs. It is possible to meander offsets through waveguide bends or change the width of the waveguides to adjust their electrical length. It is also possible to insert passive phase shifters and/or attenuators for phase and amplitude adjustments. FIG. 14 is depiction of the combination of outputs using a three-way planar broadwall coupler.

Figure 15:
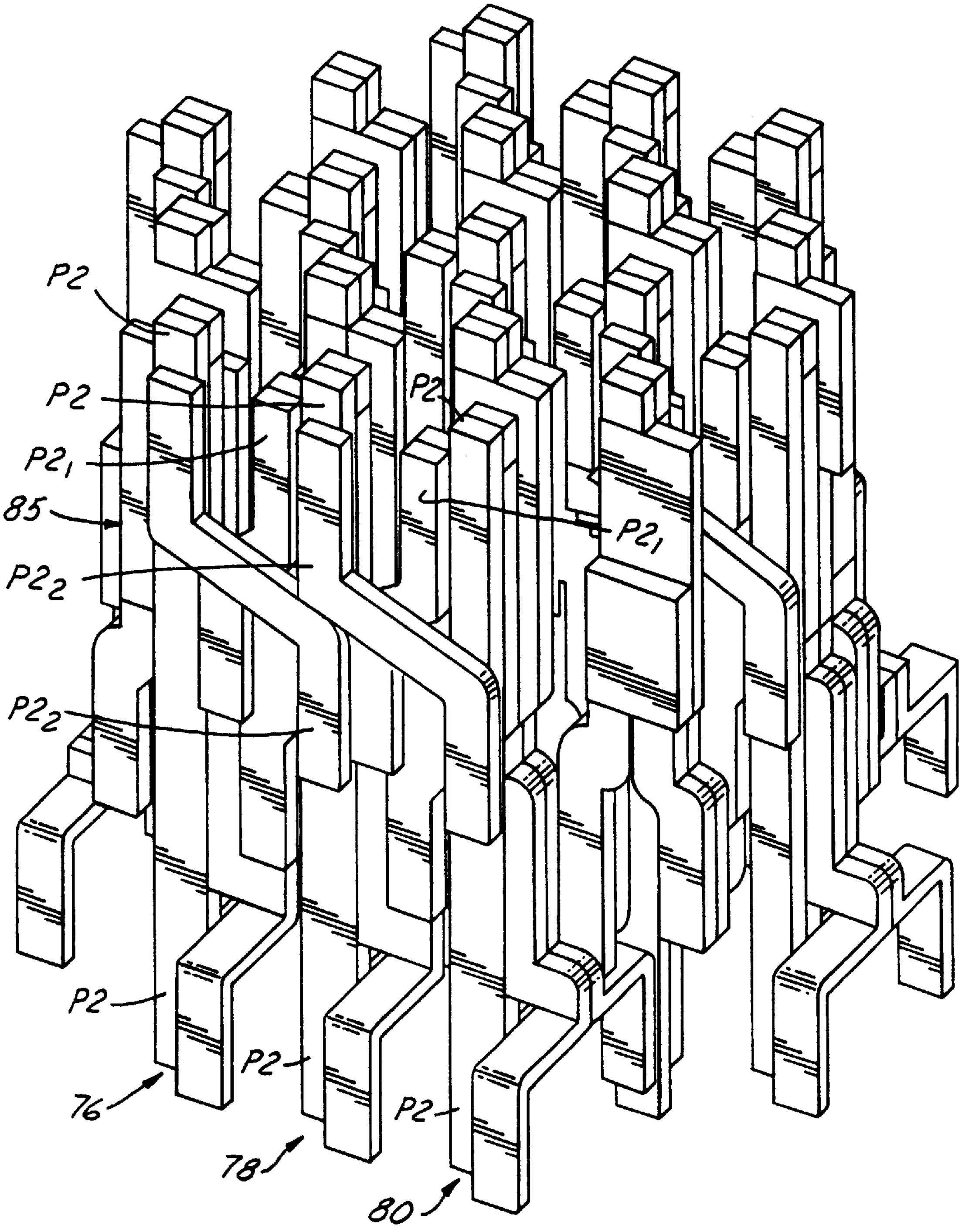
FIG. 15 is a front three-dimensional perspective view of the waveguide implementation of the present invention.

FIG. 15 is a three-dimensional perspective view of a cluster of elements implemented using the waveguide configuration described above with reference to FIGS. 13 and 14. The rows have alternating configurations of primary and non-primary polarizations. For example, FIG. 15 shows elements 76, 78 and 80 having a primary polarization P2 divided three ways, P2, $P2_1$, and $P2_2$ which correspond to what is shown in FIG. 13. The non-primary polarization P1 is divided four ways but is not clearly shown in FIG. 15.

Figure 16:
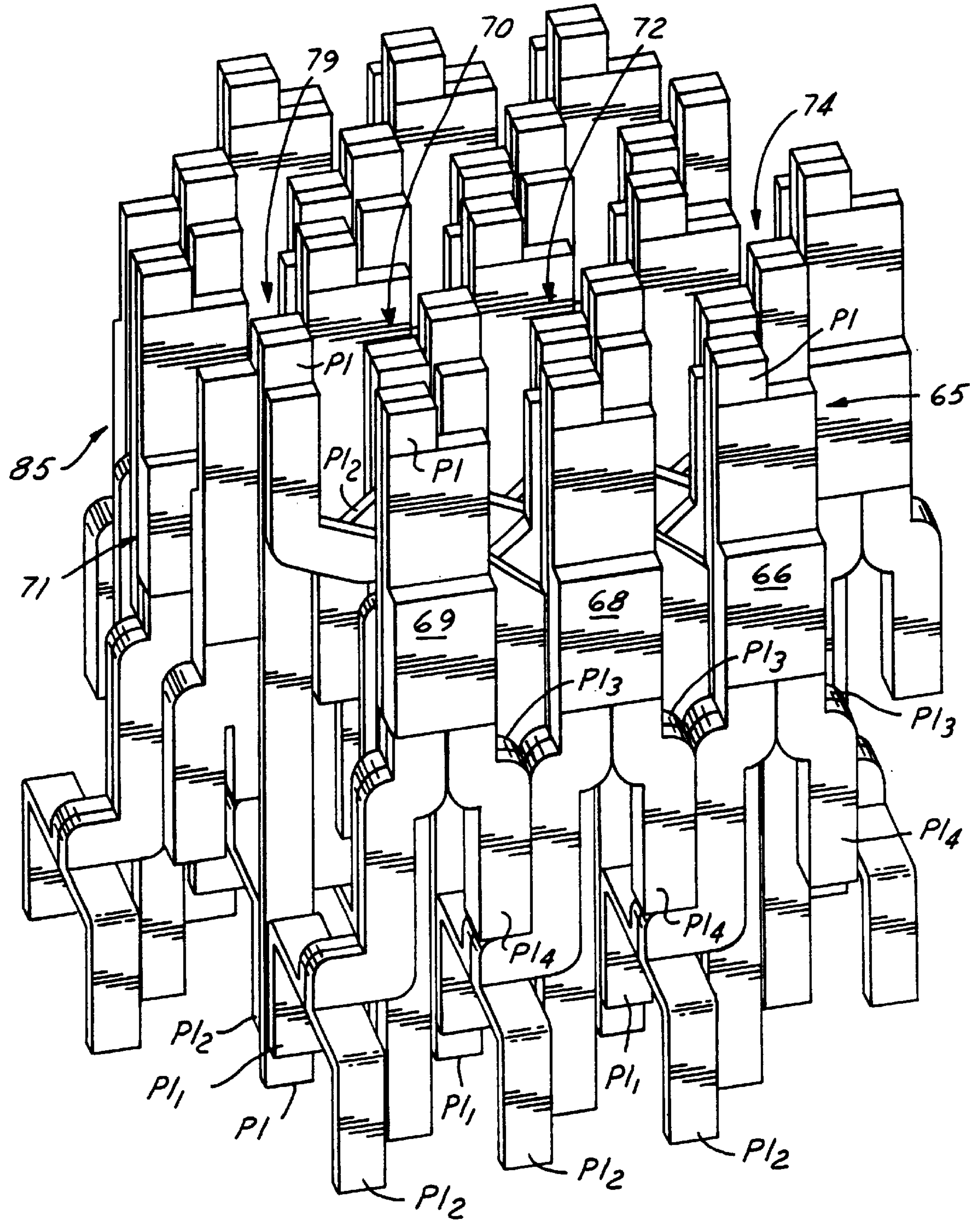
FIG. 16 is a rear three-dimensional perspective view of the waveguide implementation of the present invention.

FIG. 16, another perspective, clearly shows four-way power division. Take, for example, row 65. The non-primary polarization P1 is divided four ways, $P1_1$, $P1_2$, $P1_3$, and $P1_4$.

The combining network can be described with reference to the 3-D perspective shown in FIGS. 15 and 16. Take, for example in FIG. 15, the center element 78 in row 85. The through signal P2 is aligned with signals from the adjacent elements 76 and 80. $P2_2$ from element 76 is bent to align and combine with P2 in element 78. Likewise, $P2_1$, from element 80 is bent to align and combine with P2 from element 78. This three dimensional example corresponds with what is shown in FIG. 13 with reference to row 71 where $P1_1$ from element 70 and $P1_2$ from element 74 are aligned with P1 in element 72.

The two-way combining that is described with reference to rows 65 and 85 in FIG. 13 is clearly shown in the three dimensional waveguide configuration of FIG. 16. It was described herein that in row 65, signals $P1_1$ and $P1_3$ from elements 66 and 68 combine into 81. In the three-dimensional perspective view shown in FIG. 16 waveguides $P1_1$ from element 66 is combined with $P1_3$ of element 68. Similarly, in row 65, signal $P1_2$ and $P1_4$ from elements 68 and 69 combine into 83.

Three-way combining is also shown in FIG. 16. Element 69 in row 65 has a non-primary polarization P1 divided four ways. $P1_1$ of that divided signal is combined with P1, the primary polarization through signal in an element 79 in the adjacent row 71. Likewise, from the opposite direction, a signal 83 from an element in row 85 is combined with P1 of the element 79 in row 71.

Seven-way combining is accomplished by two levels of two-way combining in two rows and then a three-way combination among three adjacent rows. For example, two-way combining in row 65 results in 81 and two-way combining in row 85 results in 83. Finally, three way combining among signal 81 in row 65, signal 83 in row 85, and signal P1 in row 71 will result in seven-way combining.

While it is not clearly shown in FIG. 16, P1 of element 79 will also have undergone alignment with signals from adjacent elements in the same row. Then three-way combined signals from adjacent rows as is shown results in seven-way combining.

The two-way combining occurs between elements in the same row having the same secondary polarization. The three-way combining occurs between elements in adjacent rows. The elements in one row will have a primary polarization that is the same as the non-primary polarization of the elements in the adjacent rows. The primary polarization will have been divided three ways. The through signal will be combined with the non-primary signal of adjacent elements that has been divided four ways. The resultant beam of the present invention has seven components, however, no seven-way power dividers and combiners are required. Less expensive, less complex three and four-way dividers are used and two and three-way combiners in conjunction with the polarization and frequency arrangement to accomplish what is done with seven-way dividers and combiners in the prior art.

The beam-forming network of the present invention reduces the divider network of a dual polarization communications system to a 1:3 divider for elements in the same column having a primary polarization with a 1:4 divider for elements in adjacent columns having a non-primary polarization that is the same as the primary polarization in the previous column. This configuration allows smaller divider and combiner structures and more efficient routing in a restricted design space. The routing, as described in the waveguide implementation, does not require crossovers. The construction over prior art beam-forming networks is simplified, thereby simplifying the assembly as well. Any planar technique may be employed. As described herein with reference to FIGS. 11*a* through 16, the beam-forming network of the present invention is particularly amenable to waveguide structures that allow low loss at high frequencies.

While particular embodiments of the invention have been shown and described, numerous variations and alternate embodiments will occur to those skilled in the art. Accordingly, it is intended that the invention be limited only in terms of the appended claims.

What is claimed is:

1. A multiple beam antenna system comprising:

a feed array having a plurality of feed elements arranged in columns and rows, said feed array producing feed signals constituted of composite beams, said feed elements each having a primary polarization and a non-primary polarization that is different from said first polarization, said feed elements in a row having a frequency that differs from a frequency of said feed elements in an adjacent row;

a network of dividers for dividing said composite beams into a plurality of beam components, said feed elements in a column having said primary polarization being divided in a first predetermined ratio and said non-primary polarization being divided in a second predetermined ratio that is different from said first predetermined ratio, whereby each of said feed elements has beam components that feed less than all neighboring feed elements; and a network of combiners for combining said beam components having the same polarization into at least one feed signal, said beam components being received from adjacent elements in a same column and diagonal elements in adjacent columns.

2. The antenna system as claimed in claim 1 wherein said feed first predetermined ratio is 1:3 and said second predetermined ratio is 1:4.

3. The antenna system as claimed in claim 2 wherein said primary polarization is right hand circular polarization and said non-primary polarization is left hand circular polarization for a first column and said primary polarization is left hand circular polarization and said non-primary polarization is left right hand circular polarization for a column adjacent said first column.

4. The antenna system as claimed in claim 1 wherein said network of dividers and said network of combiners are implemented using strip line technology.

5. The antenna system as claimed in claim 1 wherein said network of dividers and said network of combiners are implemented using waveguides coupled in a predetermined pattern by way of couplers.

6. The antenna system as claimed in claim 5 wherein said first predetermined ratio is 1:3 and said second predetermined ratio is 1:4.

7. The antenna system as claimed in claim 6 wherein said network of combiners further comprises two-way combination for elements in a same column and three-way combination for elements in an adjacent column.

8. The multiple beam antenna system as claimed in claim 6 wherein said elements having two-way combination combine in a horizontal plane and said elements having three-way combination combine in a vertical plane.

9. The multiple beam antenna system as claimed in claim 8 wherein said two-way, horizontal combination is accomplished by way of a narrow wall combiner.

10. The multiple beam antenna system as claimed in claim 8 wherein said three-way, vertical combination is accomplished by way of a planar broadwall coupler.

11. The multiple beam antenna system as claimed in claim 5 further comprising phase and amplitude compensation in said couplers.

12. The multiple beam antenna system as claimed in claim 11 wherein said phase and amplitude compensation is introduced into said couplers by way of passive phase shifters.

13. The multiple beam antenna system as claimed in claim 11 wherein said phase and amplitude compensation is introduced into said couplers through attenuators.

* * * * *